United States Patent [19]

Jones et al.

[11] 3,899,642

[45] Aug. 12, 1975

[54] METHOD OF DISTRIBUTING TONE AND ALERTING SIGNALS IN A TDM COMMUNICATION SYSTEM

[75] Inventors: Ivor Jones, Winchester, England; Hans Rudolf Muller; Daniel Wild; Pitro Alois Zafiropulo, all of Adliswil, Switzerland

[73] Assignee: International Business Machine Corporation, Armonk, N.Y.

[22] Filed: Mar. 29, 1973

[21] Appl. No.: 345,938

[30] Foreign Application Priority Data

Mar. 30, 1972 Switzerland ........................ 4775/72

[52] U.S. Cl. .......................... 179/18 J; 179/15 BY

[51] Int. Cl. ........................................ H04m 3/00

[58] Field of Search ...................... 179/18 J, 15 BY

[56] References Cited

UNITED STATES PATENTS 3,670,108 6/1972 Andersen .......................... 179/18 J

*Primary Examiner*—Ralph D. Blakeslee

[57] ABSTRACT

Status and alerting signals are distributed in a TDM communication system in a split-up form in broadcasting mode: the cadencing information of all status/alerting signals is distributed in word format on an existing signaling channel, each bit of such a word representing the scan value of a different status/alerting signal at a given moment. The basic tone common to all status/alerting signals may be distributed in coded form on a special or a common channel like voice signals. Any terminal instructed to do so will regenerate any required tone signal for itself.

9 Claims, 7 Drawing Figures

PATENTED AUG 1 2 1975 3,899,642

SHEET 1

METHOD OF DISTRIBUTING TONE AND ALERTING SIGNALS IN A TDM COMMUNICATION SYSTEM

BACKGROUND OF THE INVENTION

1. Field of the Invention

This invention relates to communication systems, and more particularly to improved means for providing status or alerting signals in such systems.

2. Description of the Prior Art

In communication systems, particularly in telephone systems, certain conditions are notified to a party by tone or alerting signals. Such conditions may be e.g. the availability of central exchange facilities for dialing and setting up a connection (dial tone), the non-accessibility of a called party (busy tone), or the completion of a connection between a calling and a called party (ringing signal and ringback tone).

In known systems, tone signals are centrally generated and selectively distributed to those channels or lines on which a tone signal must be transmitted to a terminal. Signal machines may be used for this purpose generating a basic tone which is switched on and off periodically by various cam contacts according to the tone signal patterns. Complete tone signals are thus available at the contact output lines, which are furnished (spatially or in time division multiplex) by a special distributing network to individual channels, as required.

Tone signals may also be generated fully electronically. In a known device for time division multiplex systems, the basic tone furnished by a generator is sampled once in each channel interval (time slot). The sampled values are transferred to a switch which is opened and closed by a binary control signal in such a way that different tone signals appear already in a time division multiplex distribution on assigned channels, as required. For generating this binary control signal a particular unit is required in which the cadencing signals of the tone signals, i.e. their envelope curves, are combined with information on the presently existing assignment of tone signals to particular channels.

The known methods of tone signal distribution have some disadvantages for TDM communication systems. First, a connection, i.e. a channel between the exchange and a terminal is required for the transmission of tone signals. Though such a connection is required during a conversation, the voice channel could be used by other parties during the time of mere tone signal transmission (e.g. busy tone when desired trunk line or called part not available), if such transmission could be achieved in another way.

A further disadvantage is the necessity for a special distributing unit for applying the tone signals generated in the exchange to selected lines or channels, in which storage must be provided for the information on temporary assignment between tone signals and any number of selected channels.

SUMMARY OF THE INVENTION

It is an object of the present invention to enable a method of tone signal distribution without the above disadvantage, which is particularly suited for telephone systems having distributed time division multiplexing in a loop structure, in which information is transferred digitally and extracted automatically by controllers of the attached terminals.

The invention is concerned with a method of distributing tone and alerting signals to terminals in a time division multiplex communication system, which is characterized in that:

binary sample bits of the cadencing signals for all tone and alerting signals are concurrently permanently transmitted over a common time-division multiplex channel accessible by all terminals, all sample bits corresponding to one sampling time being combined in one cadence control word; and that a terminal generates the tone or alerting signal temporarily required for it, after receiving a corresponding command, by evaluating the received cadence control words and influencing a separately distributed or locally generated basic signal with a regenerated cadencing signal.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Tone Signals and their Constituent Parts

Figure 1:
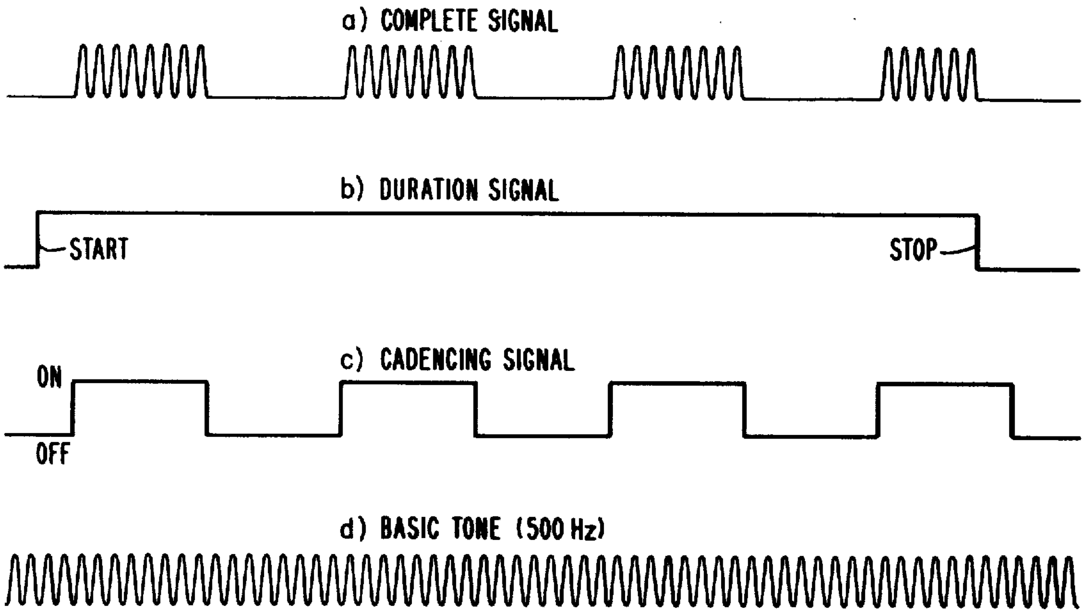
FIG. 1: The waveform of a tone signal and of its constituent partial signals.

In FIG. 1 the waveforms of a complete tone signal and its constituents are shown schematically. To generate the complete signal (*a*), a basic tone (*d*) — which in many systems is a sine wave of 400 to 500 Hz — is generated and is periodically switched on and off by a binary cadencing signal (*c*). Furthermore, a duration signal (*b*) determines the period over which the tone signal is to be received by any particular terminal.

The different tone signals of a given system usually have one common basic tone frequency and they differ only in their cadencing.

Figure 2:
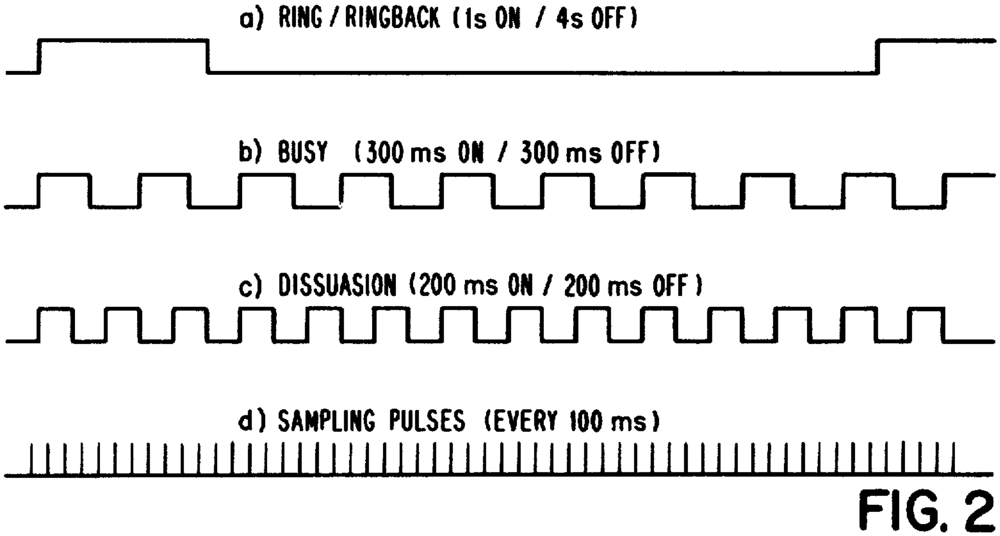
FIG. 2: The waveform of the cadencing signal for various tone and alerting signals.

Cadencing signals for some tone and alerting signals are shown in FIG. 2 at (*a*) for the ring and ringback signals (the base frequency for ringing, however, being 25 Hz in most cases, whereas the ringback signal has the usual tone frequency of 400 . . . 500 Hz); at (*b*) for the busy signal; and at (*c*) for a tone signal that indicates to the calling party a dialing error or a malfunctioning of the system. Many other tone signals are possible, e.g. the dialing tone when a selector switch or a channel has been seized (this is assumed to be a constant tone in the embodiment disclosed here); or an attention tone used when entering into an existing connection. The cadencing patterns and their periods may depend on local public communication system regulations.

The common feature of all tone and alerting signals is that a basic signal is controlled by a binary cadencing signal. It is now suggested to provide these two constituents separately and to combine them locally for regenerating a complete tone signal (or alerting signal) where it is required.

Figure 3:
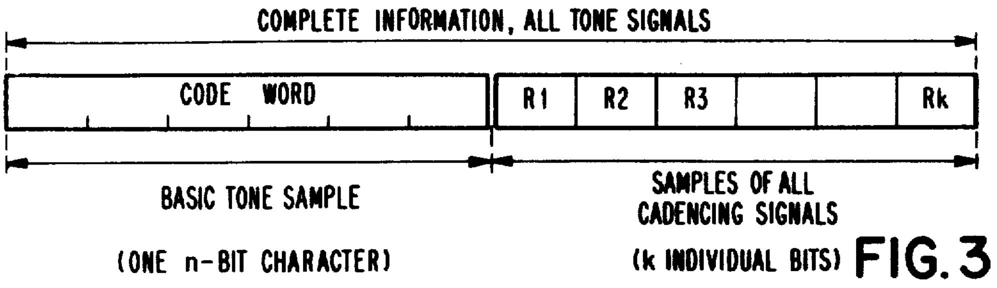
FIG. 3: A data format for the coded representation, in two separate bit groups, of all tone signals available in a system.

A principle for separate handling and transmission of tone signal constituents is illustrated in FIG. 3. The basic tone can be sampled like a normal voice signal (with a sampling frequency of e.g. 8 kHz); the sample values are then coded, e.g in PCM, and transmitted sequentially as code words ($n$-bit characters). The cadencing signals are sampled all in parallel with a sampling frequency much lower than that used for the basic tone because the cadencing pulses are very long as compared to the period of the basic tone. At each sampling time (cf. FIG. 2*d*) one binary sample value is obtained for each cadencing signal. For $k$ different tone signals there will be $k$ individual bits which can be combined into one group and transmitted in combination.

Time Division Multiplex Frame Structure

Figure 4:
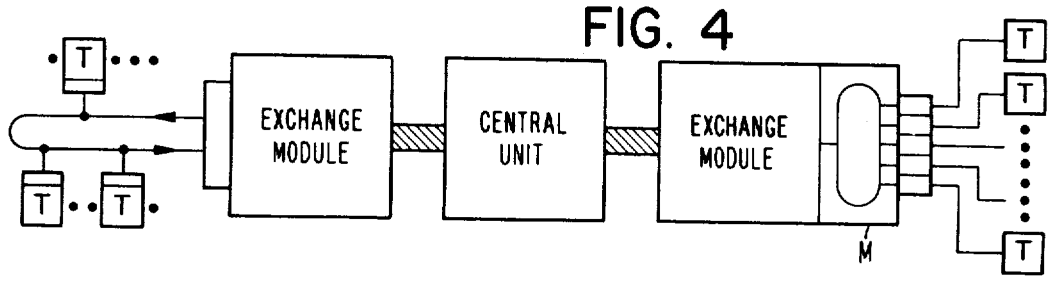
FIG. 4: The block diagram of a communication system providing TDM switching for a number of terminals.

FIG. 4 is a block representation of a communication system with TDM switching for the attached terminals, in which a distribution of tone or alerting signals according to the invention may be implemented. Terminals T (each with a terminal controller) are either connected to their exchange module by a loop transmission line having itself the function of a multiplexer/demultiplexer, or a concentrated multiplexer/demultiplexer (M) is provided which has an internal loop structure and to which the terminals, i.e. their terminal controllers, are connected in a star configuration.

Figure 5:
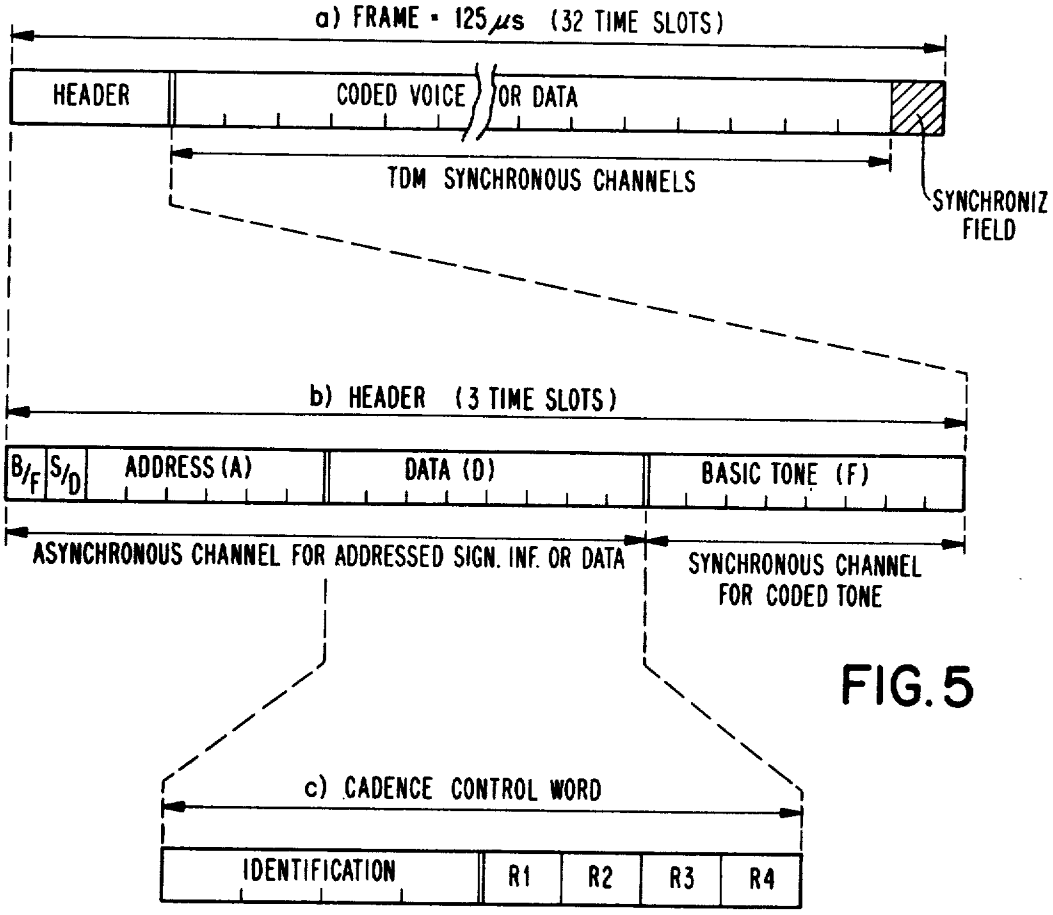
FIG. 5: Format and subdivision of TDM frames in a communication system according to FIG. 4.

On the loops, information units are organized in cyclic frames as shown at (*a*) in FIG. 5. The principle of the frame structure used was already described in Swiss Patent No. 514,268. Each frame of 125 $\mu s$ duration is e.g. subdivided into 32 time slots. The first three time slots constitute a header which is described in more detail below. The last time slot is used as synchronization field for determining the frame boundary. The remaining time slots each correspond to a "channel" for cyclic transmission of voice or data; one information unit (coded voice sample, or data byte) per channel is transmitted by each frame (synchronous transmission).

In the header, the sections of which can be seen at (*b*) in FIG. 5, either signaling information or data may be transmitted together with an associated address (as has been described in the above-cited Swiss Patent No. 514,268). The two time slots A and D together represent an asynchronous channel which is usually seized for one multiplex cycle (i.e. one frame) only, and which in each cycle transmits a complete "message" (= address plus data). This is, therefore, a "submultiplex" channel available to all attached devices. Position B/F in the first time slot indicates whether the submultiplex channel is still available for the current multiplex cycle, or whether it is already occupied; position S/D indicates whether time slot D which follows carries signaling information for controlling terminal or central operations, or data which are to be transmitted transparently.

Tone Signal Distribution

It is now suggested to distribute the information for all tone signals available in a system through this header portion of the multiplex frames in an arrangement as schematically shown in FIG. 3. Tone signals can thus be offered to all terminals in a broadcast mode; only those which were previously instructed by suitable control signals extract from the loop the tone signals assigned to them.

Basic tone and cadencing information are transmitted separately, as explained already in connection with FIG. 3. In the embodiment selected for illustration of the invention, an extra multiplex channel is provided for the basic tone which channel is constituted by the third time slot in each frame header (F). A coded sample value is thus transmitted every 125 $\mu s$ so that each terminal can regenerate the basic tone from these sample values at any time.

It is possible, of course, to generate the basic tone locally in each terminal; this, however, has some disadvantages and the solution described in the illustrative embodiment seems to be the most flexible.

It allows to use for regeneration of the basic tone the voice signal decoding equipment available anyway in each terminal, because the sampling frequency and the code for the basic tone channel were chosen to be identical to those in the normal (synchronous) voice channels.

Cadencing information is not transmitted — as is the basic tone — in a devoted channel but rather in the submutiplex channel (asynchronous channel) alternatively with other signaling information or data. This is possible because the cadence sample values need be transmitted by far not as often as the sample values of basic tone or of voice signals, because of the long intervals of the binary cadencing signals. The sampling rate must, of course, be chosen such that the period of each cadencing signal is an integer multiple of the sampling period (the interval between two sampling pulses).

If a cadence control word is transmitted in a multiplex frame, the first time slot, i.e. address part A, contains a universal address. The result is that all terminals extract the following data part D from the line for processing it. This data part, i.e. a cadence control word, includes an identification field indicating that cadencing information is now available (cf. at *c*) in FIG. 5), and the group of binary sample bits for all cadencing signals (bits $R_1$, $R_2$, $R_3$, etc.). All received sample bits are valid until the next set of sample bits is received, i.e. for a period of 100 ms in the embodiment described.

Figure 6:
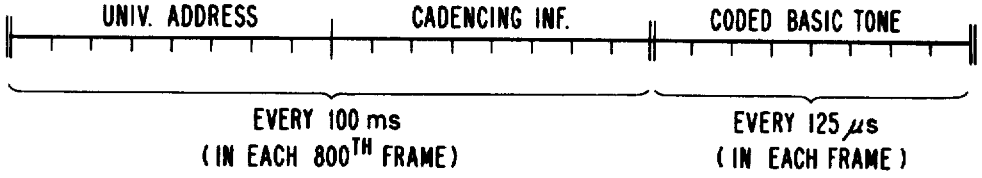
FIG. 6: A time schedule for the transmission of tone signal information in the header portion of TDM frames.

FIG. 6 gives a review of the situation: cadencing information is transmitted, together with a universal address calling all terminals, every 100 ms, i.e. in each 800th frame, over a generally available channel, alternatively with data or other signaling information. Base tone information is transmitted every 125 $\mu s$, i.e. in each frame like voice signals, over a special channel.

Terminal Facilities

Figure 7:
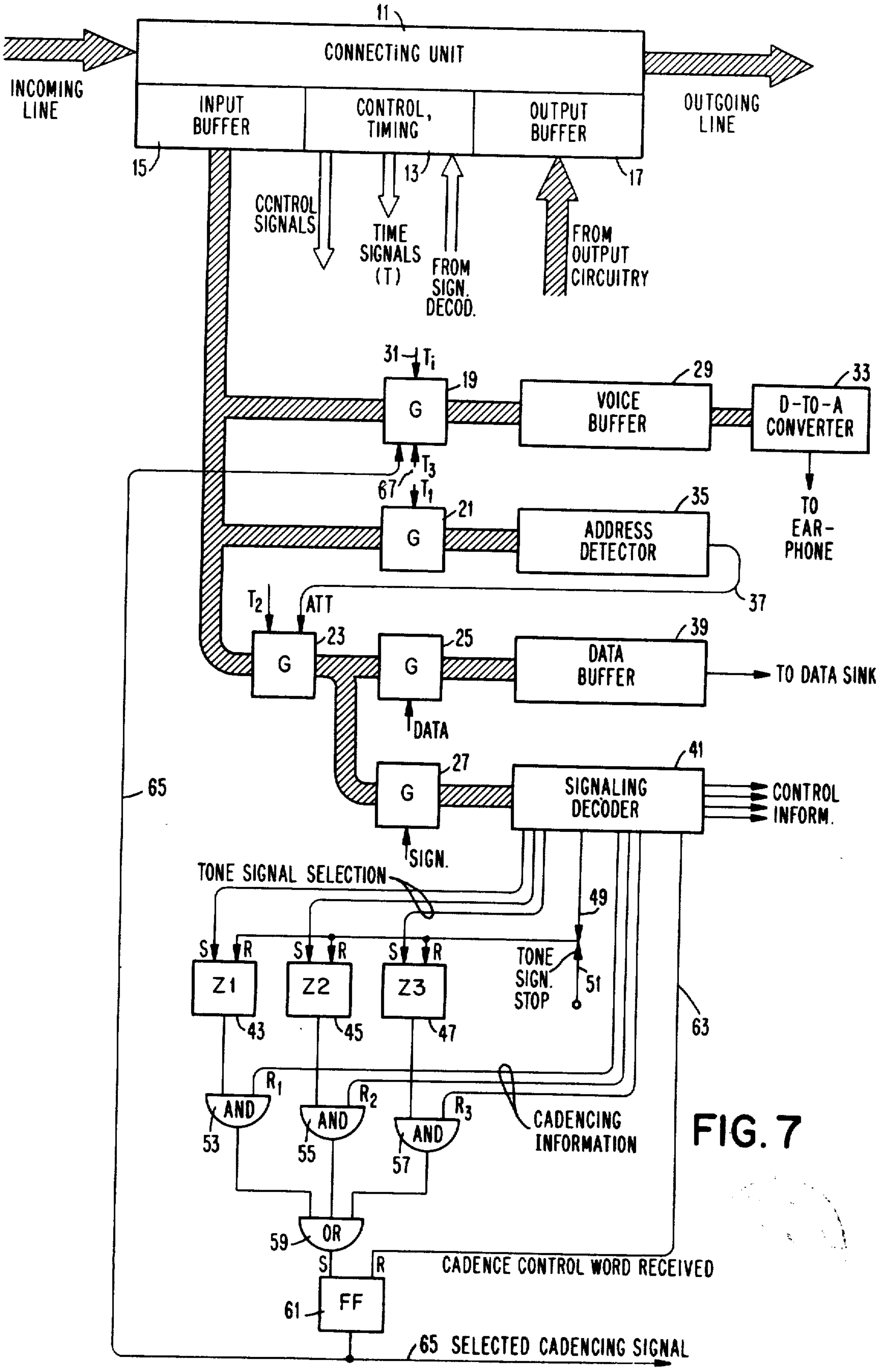
FIG. 7: The input part of a terminal, including the circuitry required for the reception of tone signals distributed according to the invention.

The receiving part of a terminal is shown in block representation in FIG. 7, particularly those parts used for regeneration of tone signals. The transmitting part comprising microphone, voice signal coder, etc., is not shown as it is not of interest for the invention, and the control unit for the general functions of the terminal is only shown as one block 13. It furnishes time signals $T_1$, $T_2$, etc. which indicate the time slot or channel number for the data available in the input buffer 15 or output buffer 17, respectively. The control unit also provides control signals for individual logic units and gates of the terminal, and receives control information from the decoder of the receiving part.

Data receiving on the incoming line are transferred by a connecting unit 11 to the input buffer 15. These data can be distributed by gates (G) 19 through 27 to different units depending on the time slot number (channel) in which they were received. If the terminal is engaged in a voice connection over a voice channel *i*, the coded voice samples from each *i*-th time slot are gated by time signal $T_i$ through gate 19 to a voice buffer 29. The value *i* is stored in control unit 13 when a connection is set up, so that it will activate control line 31 to gate 19 during availability of data from each *i*-th time slot. Stored voice samples are reconverted to analog signals in D to A converter 33, which are then applied to the earphone of the hand-set.

Signals from the submultiplex channel of the header (time slots 1 and 2 in FIG. 5) are gated by gates 21 and 23. During the first time slot (time signal $T_1$) there always appears an address which is gated to address detector 35. If the respective terminal's own address or a general address was received, a lasting signal ATT is available on line 37. During the next time slot (time signal $T_2$) the data, or signaling information respectively, which together with the just received address constituted a message, is gated by gate 23 (an AND function is performed for inputs $T_2$ and ATT). In case of data, a corresponding signal DATA opens gate 25 to data buffer 39 from where the received data can be transferred to a data sink attached to the terminal, e.g. a card punch or a printing unit.

If, however, signaling information was received, control signal SIGN. is available at gate 27 and the bits from time slot 2 are gated to a signaling decoder 41, which provides control information as input to control unit 13. Signaling decoder 41 also receives the cadence control words for tone signals because these are also transmitted in time slot 2 and flagged as "signaling information". Therefore, the decoder also provides control signals to the assembly for tone signal regeneration which is described in detail in the following:

Tone Signal Regeneration

To regenerate a tone signal, the following information is required in a terminal:

a. Identification of tone signal;
b. Start and stop of the time period during which tone signal is to be received;
c. Cadencing information;
d. Basic tone.

Latches Z1, Z2, Z3 (43, 45, 47) are provided for the functions *a* and *b;* i.e. identification and duration of tone signal. The number of latches is equal to the number of different tone signals available (three in this example). If a terminal is to "receive" a tone signal it is so instructed by a suitable code word sent over the signaling channel. Signaling decoder 41 then activates one of the lines designated TONE SIGNAL SELECTION so that one of the latches Z1 through Z3 is set. As long as this latch remains set, the corresponding tone signal is received. When the terminal receives a code word TONE SIGNAL STOP, all latches are reset by a signal on line 49. Resetting can also be effected by a signal on line 51 generated within the terminal, e.g. when the handset is hooked on.

Each time when the terminal receives a cadence control word as shown in FIG. 5, the output lines of decoder 41 designated CADENCING INFORMATION in FIG. 6 are activated according to the received pattern. (The tone signal represented by bit $R_4$ is not used in the terminal of FIG. 7.). The received sample bits of all cadencing signals are then applied separately each to one of the AND circuits 53, 55 and 57. As the other input of each AND circuit is connected to the output of one of latches 43 through 47, only the one cadence signal sample bit which represents the selected tone signal is transferred to OR circuit 59.

The output of OR circuit 59 is applied to the set input of a latch 61. This latch is reset immediately after receipt of each cadence control word by a signal on output line 63 of decoder 41. Thereafter, latch 61 assumes, controlled by the output of OR circuit 59, a state corresponding to the selected cadence sample bit just received (i.e. it is either set to 1 or left in the 0 state). On the output line 65 of latch 61 a square waveform signal is furnished which is equal to the cadencing signal (as shown in FIG. 2) of the selected tone signal (except for a possible phase shift). The information listed under *a*, *b* and *c* in the beginning of this section is now available. This cadence information is used to control the basic tone.

A coded sample of the basic tone is available from the third time slot of each frame (cf. FIG. 5) at the output of buffer 15, and thus at the input of gate 19. This gate is designed to be opened either when an active signal is available on control line 31, or when active signals are simultaneously available (AND function) on control lines 65 and 67. On line 67 the cadencing information of the selected tone signal is available; line 67 is activated by a time signal $T_3$ (corresponding to time slot 3) from control unit 13. Thus gate 19 transfers the basic tone samples to voice buffer 29 only if the cadence signal is equal to 1. The complete tone signal is regenerated as the analog signal by D-to-A converter 33 and applied to the earphone of the handset.

The tone signal can, of course, also be applied to a loud speaker or similar device over a suitable gating circuit.

If the basic tone is not transmitted in coded form over an extra channel but is generated locally, it can as well be switched on and off by the control signal on line 65.

For alerting signals, a selected cadencing signal is regenerated as described above. However, the basic tone distributed in coded form will not be used for most alerting signals. Instead, the selected cadencing signal on line 65 will be used to switch on and off a buzzer, a lamp or similar device, as required.

In summary, the present invention facilitates simple distribution of tone or alerting signals in digital form to the terminals of a time division multiplexed (TDM) communication system in a word organized scheme. For the mere transmission of tone signals no voice connection with the respective terminal need be available; and no switching equipment is required for this purpose. It is only necessary that a common signaling channel, e.g. in submultiplex mode, be available for all devices. The introduction of intrusion tone signals into an existing voice connection is easily possible despite the coded representation of voice signals, because voice and tone signals are separately transmitted. A modification of any particular tone signal, or of the whole set of tone signals, is readily effected for adaptation to new requirements.

While the invention has been particularly shown and described with reference to a preferred embodiment thereof, it will be understood by those skilled in the art that various changes in form and detail may be made therein without departing from the spirit and scope of the invention.

What is claimed is:

1. The method of distributing tone and alerting signals to terminals in a time division multiplex communication system, characterized by
   concurrently transmitting binary sample bits of the cadencing signals for all tone and alerting signals over a common time-division multiplex channel accessible by all terminals, all sample bits corresponding to one sampling time being combined in one cadence control word;
   and generating in a terminal the signal temporarily required for it, after receiving a corresponding command, by evaluating the received cadence control words and influencing a separate basic signal with a regenerated cadencing signal.

2. The method according to claim 1, characterized by sampling and coding the common basic tone of all tone signals centrally, and distributing the code words representing the samples over a time division multiplex channel provided particularly for this purpose, to which all terminals always have access.

3. The method according to claim 1, characterized by transmitting a cadence control word over the common channel in every $n$-th frame, the ratio $n$ between the sampling period of the cadencing signals and the multiplex frame period being chosen such that the period of any of the cadencing signals is an integer multiple of the frame sampling period.

4. The method according to claim 1, characterized by distributing the cadence control words over a common time-division multiplex channel which is designed to convey messages comprising a data unit and an associated address, and accompanying each cadence control word during transmission with a universal address valid for all terminals.

5. The method according to claim 1 characterized by providing a local signal generator and using the cadencing information for the ringback tone in a called terminal to switch on and off the local signal generator in such a way that the required ringing signal is obtained.

6. The method according to claim 2 characterized by providing and setting control switch means in a terminal to a tone signal to be received;
   providing a bistable cadence switch in the terminal and,
   each time a cadence control word is received by the terminal, resetting said bistable cadence switch and then either leaving it in its first state or setting it to its second state, depending on that sample bit of the received cadence control word, which corresponds to the tone signal to which the control switch means are set;
   providing digital-to-analog conversion means for voice signals and an electro-acoustic transducer for the same in the terminal, operable whenever the bistable cadence switch is in its second state,
   and transferring basic tone samples received by the terminal to said conversion means.

7. The method according to claim 4 characterized by providing and setting control switch means in a terminal to a tone signal to be received;
   providing a bistable cadence switch in the terminal and,
   each time a cadence control word is received by the terminal, resetting said bistable cadence switch and then either leaving it in its first state or setting it to its second state, depending on that sample bit of the received cadence control word, which corresponds to the tone signal to which the control switch means are set;
   providing digital-to-analog conversion means for voice signals and an electro-acoustic transducer for the same in the terminal, operable whenever the bistable cadence switch is in its second state,
   and transferring basic tone samples received by the terminal to said conversion means.

8. In a time-division multiplex communication system in which a plurality of terminals is connected to lines over which data are transferred in periodic time frames each comprising a plurality of time slots at least one of which is available for the transmission of signaling data, and
   binary sample values of the cadencing signals of all tone and alerting signals are distributed in signaling time slots in regular intervals to all terminal devices,
   a terminal device comprising:
   means for recognizing received command data identifying a selected type of tone or alerting signal to be received by that terminal device,
   means responsive to the recognizing means for storing an indication of said type of tone or alerting signal to be received,
   means for applying received binary sample values of cadencing signals to first gating means which are responsive to output signals of said storing means to gate a selected one of the binary sample values corresponding to the tone or alerting signal to be received,
   means for reproducing a cadencing signal from the output signal of said first gating means, and
   second gating means for gating a basic tone signal under control of said reproduced cadencing signal.

9. In a time-division multiplex communication system in which a plurality of terminals are provided for receiving data representations transmitted in cyclic frames, and
   binary sample values of the cadencing signals of all tone and alerting signals and of their basic tone are distributed in regularly appearing time slots of the frames,
   a terminal device comprising:
   signal storage means and means responsive to the contents thereof for regenerating a selected one of the cadencing signals from received binary sample values, and
   means responsive to the regenerated cadencing signal and to received binary sample values of the basic tone to regenerate a selected complete tone or alerting signal.

* * * * *